Patented Aug. 29, 1933

1,924,972

UNITED STATES PATENT OFFICE 1,924,972

STABILIZED EGG PRODUCT

Carl J. Beckert, Wolf Kritchevsky, and Benjamin R. Harris, Chicago, Ill.

No Drawing. Application April 15, 1929
Serial No. 355,412

3 Claims. (Cl. 167—63)

In our copending applications Serial Nos. 353,664 and 353,684 filed of even date herewith, we have described a number of compositions of matter consisting of the di-hydric alcohol homologous series, and their derivatives, in combination with oils, waxes, soaps, egg material etc.

We have found in connection with this work, that for the selfsame purpose, mono-hydric alcohols can as well be used, though in much smaller quantities, owing to their much higher antiseptic properties. While it requires a minimum of 16% of a di-hydric alcohol, calculated on the water content of the finished material, 8–9% of a mono-hydric alcohol, calculated on the same basis is sufficient to stabilize an egg material, the outer limits being 7.5%–15%.

When we allude to mono-hydric alcohols, we consider the series as beginning with the propyl homologue, since the methyl and ethyl homologues are entirely unsuited to our purpose. When an amount sufficient to stabilize the egg material is added to these homologues, the egg material will be precipitated and therefore unsuitable for our uses. On the other hand, we can use the esters of the first two alcohols to advantage.

The first of the series that we can successfully use is propyl alcohol, iso-propyl alcohol and then follow the other higher members of the series as the various butyls, the amyls, and whether they be primary, secondary or tertiary, and as well their derivatives, and their esters and ethers. Any of these chemical agents when mixed with egg materials in a proportion approximating 10% of the water content of the egg material will yield a stable egg product that will be stable for any length of time under ordinary room temperatures and will not spoil or deteriorate, nor assume an offensive odor.

This previously described product can be mixed with any other commodities and chemicals, like vegetable oils, animal oils, mineral oils, sulphonated oils, ordinary and sulphonated soaps, sulphur and other chemicals, like acetyl resorcinol, and thus form various and different products that can be used in the cosmetic trade as a shampoo, scalp treatment, or facial massage, also for medicinal purposes like salve bases, and salves, and also for cleansing purposes like in the cleaning and softening of leather etc.

The consistency of this liquid can be obtained in any number of forms, such as a liquid, and semi-paste, paste, semi-solid, soft but immobile according to the modification of the aggregate materials added to the originally described egg materials. For instance, in order to obtain a paste for a hair shampoo, we treat 100 pounds of egg yolk commercial, which is substantially pure egg yoke, with a small percentage of egg white contained therein, and the water content of same being about 58%, with 5 pounds of normal propyl alcohol. This product, per se, will be stable and keep for any length of time. In order to make a paste from this mixture, which is easily distributed through the hair, and which is easily soluble, we add 10 pounds of anhydrous sulphonated soap. If the soap should contain any water, sufficient propyl alcohol is added so that the amount of the alcohol present equals 8% of the water present. More alcohol may be added, if desired, but it is not necessary. On the other hand, if the amount of alcohol added equals or exceeds 25% of the water present, the egg material will be precipitated or coagulated, and thus be unsuitable for this stated purpose.

Sulphonated soap mentioned in the previous example can be substituted by or replaced with sulphonated oil or vegetable oils, like castor or corn oil, or mineral oils like White Russian oil or vaseline, or other oily substances like diethyl phthalate, cetyl alcohol or various waxes etc.

The propyl alcohol mentioned in the previous example can be replaced with or substituted by iso-propyl alcohol, the butyl alcohols, the amyl alcohols and any and all of the homologues of the alkyl mono-hydric alcohols, (excepting methyl, and ethyl) and all of their derivatives, ethers and esters such as the acetates, and mixtures thereof.

Further, the commercial egg yolk mentioned in the foregoing example can be replaced with or substituted with natural egg-white material as it comes from the shell, or that of the whole egg.

The following represent a few examples of products that we find suitable for our purpose:

No. 1—
| | Pounds |
|---|---|
| Egg yolk | 100 |
| Propyl alcohol | 5 |

No. 2—
| | |
|---|---|
| Egg white | 100 |
| Amyl alcohol | 10 |

No. 3—
| | |
|---|---|
| Mixed eggs | 100 |
| Propyl ether | 8 |

No. 4—
| | |
|---|---|
| Egg yolk | 100 |
| Propyl alcohol | 10 |
| Sulphonated oil | 10 |

No. 5—
| | Pounds |
|---|---|
| Egg yolk | 100 |
| Butyl alcohol | 10 |
| Corn oil | 100 |

No. 6—
| | |
|---|---|
| Whole egg | 100 |
| Amyl acetate | 10 |
| White petroleum | 3 |

No. 7—
| | |
|---|---|
| Egg yolk | 100 |
| Propyl alcohol | 10 |
| Corn oil | 50 |
| Sulphur | .5 |

No. 8—
| | |
|---|---|
| Egg yolk | 100 |
| Iso-propyl alcohol | 20 |
| Starch | 5 |
| Perfume | .5 |

No. 9—
| | |
|---|---|
| Egg yolk | 100 |
| Iso-propyl alcohol | 20 |
| Chrysarobine | 2 |
| Perfume | .5 |

No. 10—
| | |
|---|---|
| Egg yolk | 100 |
| Iso-propyl alcohol | 20 |
| Ichthyol | 5 |
| Perfume | .5 |

The examples just cited are interchangeable as referring to the stabilizing agent i. e. the alkyl mono-hydric alcohols with noted exceptions, and their derivatives, may be used in place of the propyl alcohol, or the amyl alcohol, or the propyl ether, etc., and mixtures thereof; and as a matter of fact and record, any of the alkyl mono-hydric alcohols or their derivatives with noted exceptions may be used interchangeably without appreciably affecting the resultant product when the amount calculated on the basis of the water content in the product is used as previously directed.

The selfsame interchanging of the aggregate materials such as refers to the soaps and oils used may also be varied without changing the character or fitness of use of the resultant product.

We have also found that instead of using yolk material we may also use the whites, whites in excess of the yolks, or yolks in excess of the whites, or mixed egg material, the resultant product will not be sufficiently changed to change the character of our product for the use intended.

We have also found that instead of using liquid eggs we may use the dried egg materials such as dried egg albumen or dried egg yolk, but by first adding to the material and emulsifying it with a requisite amount of water, and then handling in the same manner as noted in our original examples.

The quantities of the mono-hydric alcohols may be varied in any proportion as low as that requisite for the preservation of the egg material, and as high as practical below the quantity that will precipitate or coagulate the egg material.

By the expression "egg material" we mean either egg yolks, pure or mixed with a little white in combination as they come from separating plants, egg whites, pure or mixed with a little yolk as they occur naturally, as the egg is separated, mixed eggs in which the yolk and the white is mixed, or powdered egg yolk and white mixed, emulsified with any desired amount of moisture, separately or together.

Under the expression "egg substance" we understand the solid matter that makes up the yolk or the white minus the moisture present in it; in other words, egg substance and moisture would mean either natural yolk, natural white or the whole egg.

We claim:

1. A composition of matter adapted for external use and stable under normal living temperature and climatic conditions, comprising egg material and a mono-hydric alcohol of the general formula

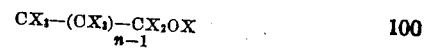

in which $n$ is any whole number, X is hydrogen, or an alkyl group like methyl, ethyl, etc., or an alcoholic radical like $CH_2CH_2OH$ or an acid radical like acetyl, etc., and derivatives of the said radicals, the total amount of carbon being not less than three, said preservative being present in the proportion of not less than 7½ percent nor more than 20 percent of the amount of water present in the finished product.

2. A composition of matter adapted for external use and stable under normal living temperature and climatic conditions, comprising egg material and a mono-hydric alcohol of the general formula

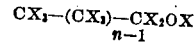

in which $n$ is any whole number, X is hydrogen, or an alkyl group like methyl, ethyl, etc., or an alcoholic radical like $CH_2CH_2OH$ or an acid radical like acetyl, etc., and derivatives of the said radicals, the total amount of carbon being not less than three, said preservative being present in the proportion of not less than 7½ percent and not more than 20 percent of the amount of water present in the finished product, and oleaginous matter, and derivates thereof.

3. A composition of matter adapted for external use and stable under normal living temperature and climatic conditions, comprising egg material, iso-propyl alcohol and oleaginous matter, and derivatives thereof.

CARL J. BECKERT.
WOLF KRITCHEVSKY.
BENJAMIN R. HARRIS.